(12) United States Patent
Oki et al.

(10) Patent No.: US 8,505,039 B2
(45) Date of Patent: *Aug. 6, 2013

(54) TRAY WITH A FITTING CONVEX PORTION

(75) Inventors: Narihiro Oki, Matsumoto (JP);
Hidetoshi Kodama, Matsumoto (JP);
Seiji Kawabata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/282,859

(22) Filed: Oct. 27, 2011

(65) Prior Publication Data
US 2012/0042328 A1 Feb. 16, 2012

Related U.S. Application Data

(63) Continuation of application No. 12/186,946, filed on Aug. 6, 2008, now Pat. No. 8,051,437.

(30) Foreign Application Priority Data

Aug. 6, 2007 (JP) ................................. 2007-204588

(51) Int. Cl.
*G11B 17/04* (2006.01)
*B41J 3/00* (2006.01)

(52) U.S. Cl.
USPC ................................ 720/604; 720/624; 347/2

(58) Field of Classification Search
USPC ................. 720/601, 603, 604, 624, 630, 617, 720/706, 715; 400/613
See application file for complete search history.

(56) References Cited

U.S. PATENT DOCUMENTS

| | | | |
|---|---|---|---|
| 6,270,176 B1 * | 8/2001 | Kahle | 347/2 |
| 6,283,285 B1 | 9/2001 | Ikebe | |
| 6,312,174 B1 | 11/2001 | Drynkin et al. | |
| 6,384,929 B1 | 5/2002 | Miller | |
| 6,896,363 B2 * | 5/2005 | Oshima et al. | 347/104 |
| 7,021,355 B2 * | 4/2006 | Cummins et al. | 156/364 |
| 7,209,156 B2 | 4/2007 | Cummins et al. | |
| 7,301,550 B2 | 11/2007 | Cummins et al. | |
| 7,311,367 B2 | 12/2007 | Salisbury et al. | |
| 7,554,680 B2 | 6/2009 | Kanai et al. | |
| 8,051,437 B2 * | 11/2011 | Oki et al. | 720/604 |
| 2002/0168211 A1 | 11/2002 | Ogasawara et al. | |
| 2009/0044208 A1 | 2/2009 | Oki et al. | |

FOREIGN PATENT DOCUMENTS

| | | | |
|---|---|---|---|
| JP | 06-042775 | | 6/1994 |
| JP | 2001-002173 | | 1/2001 |
| JP | 2001-114374 | | 4/2001 |
| JP | 2002356029 A | * | 12/2002 |
| JP | 2005212432 A | * | 8/2005 |
| JP | 2006-198875 | | 8/2006 |

* cited by examiner

*Primary Examiner* — Brian Miller
(74) *Attorney, Agent, or Firm* — Workman Nydegger

(57) ABSTRACT

There is provided a tray including a tray main body that can be nipped by a driving roller rotatably driven and a plurality of driven rollers driven to rotate by making contact with the driving roller, the tray main body having a plate shape, a concave portion in which a thin plate shaped body can be set, the concave portion being formed in the tray main body, a fitting convex portion that is fitted in a fitting hole formed in the thin plate shaped body, the fitting convex portion being provided in the concave portion, and a plurality of elastic pieces for holding the thin plate shaped body by elastically making contact with an inner edge of the fitting hole, the elastic pieces being provided along an outer edge of the fitting convex portion.

6 Claims, 13 Drawing Sheets

TRAY WITH A FITTING CONVEX PORTION

CROSS-REFERENCE TO RELATED APPLICATIONS

This application is a continuation of U.S. patent application Ser. No. 12/186,946 filed Aug. 6, 2008, which patent application is incorporated by reference herein in its entirety. That co-pending U.S. application Ser. No. 12/186,946 claims priority under 35 U.S.C. 119 to Japanese patent application serial number 2007-204588 filed Aug. 6, 2007.

BACKGROUND

1. Technical Field

The present invention relates to a tray in which a thin plate shaped body represented by an optical disk can be set, and in particular, to a tray having a plate shape which can be transmitted in a recording device represented by a printer.

2. Related Art

There is an ink jet printer constituted so as to be able to perform recording on a label surface of a medium to be recorded such as an optical disc as a thin plate shaped body represented by a CD-R, DVD, or the like by directly ejecting an ink drop among ink jet printers as examples of recording devices. In such an ink jet printer, a thin plate shaped body such as an optical disc is generally set in a tray having a plate shape, transported in a transport pathway in the ink jet printer in the state where set in the tray, thereby recording is performed on the label surface.

A concave portion in which a thin plate shaped body such as an optical disc can be set is formed in a tray main body having a plate shape which can be nipped by a driving roller and a driven roller. A fitting convex portion that fits in a fitting hole formed in a thin plate shaped body such as an optical disc is formed in the concave portion. Further, a plurality of elastic pieces that elastically make contact with an inner edge of the fitting hole formed in the thin plate shaped body are formed at an outer edge of the fitting convex portion. The thin plate shaped body is to be held by elastic forces of the elastic pieces. A conventional technique of the elastic pieces is disclosed in, for example, JP-UM-A-6-42775 (hereinafter, referred to as Patent Document 1), JP-A-2001-2173 (hereinafter, referred to as Patent Document 2), and Japanese Patent No. 3099296 (hereinafter, referred to as Patent Document 3).

When the fitting convex portion and the elastic pieces are formed in a tray to be transported in a transport pathway in the printer by a driving roller and a driven roller, an inherent technical problem as described below occurs. The problem does not occur in the case where the fitting convex portion and the elastic pieces are formed in a case or the like for merely storing a disc as shown in Patent Documents 1 to 3.

That is, when the elastic piece formed in the fitting convex portion passes through the driven roller, there is a fear that the elastic piece is pressed by the driven roller, and as a result, the state of the thin plate shaped body held by the elastic piece is unlocked by the driven roller and the thin plate shaped body such as an optical disc is disengaged from the fitting convex portion. Then, when the thin plate shaped body such as an optical disc is disengaged from the fitting convex portion, there is a fear that an intended recording result can not be obtained due to a large misalignment of a recording position and the thin plate shaped body is hung up by an element in the vicinity of the transport pathway to damage the device.

SUMMARY

An advantage of some aspects of the invention is to provide a tray which makes it possible to prevent unlocking of a state of a thin plate shaped body held by an elastic piece provided in a tray in which a thin plate shaped body such as an optical disc can be set, in particular, in a tray for use in a recording device caused by a driven roller when the elastic piece passes through the driven roller.

According to a first aspect of the invention, there is provided a tray including a tray main body that can be nipped by a driving roller rotatably driven and a plurality of driven rollers driven to rotate by making contact with the driving roller, the tray main body having a plate shape, a concave portion in which a thin plate shaped body can be set, the concave portion being formed in the tray main body, a fitting convex portion that is fitted in a fitting hole formed in the thin plate shaped body, the fitting convex portion being provided in the concave portion, and a plurality of elastic pieces for holding the thin plate shaped body by elastically making contact with an inner edge of the fitting hole, the elastic pieces being provided along an outer edge of the fitting convex portion. At lest a pair of the elastic pieces for holding the thin plate shaped body among the plurality of elastic pieces are disposed at positions to avoid areas through which the plurality of driven rollers disposed with an appropriate distance in an axis line direction of the driving roller pass.

According to the first aspect of the invention, at least one pair of elastic pieces for holding the thin plate shaped body are disposed at positions to avoid areas through which the driven rollers pass. Accordingly, occurrence of a trouble in which the elastic pieces are pressed by the driven rollers, and as a result, the state of the thin plate shaped body held by the elastic pieces is unlocked by the driven rollers and the thin plate shaped body such as an optical disc is disengaged from the fitting convex portion can be prevented.

According to a second aspect of the invention, there is provided a try in which all of the plurality of elastic pieces are disposed at positions to avoid the areas through which the driven rollers pass in the tray according to the first aspect of the invention.

According to the second aspect of the invention, all of the pluralities of elastic pieces are disposed to avoid the areas through which the driven rollers pass. Accordingly, occurrence of a trouble in which the thin plate shaped body such as an optical disc is disengaged from the fitting convex portion can be more surely prevented.

According to a third aspect of the invention, there is provided a try in which a flank that is downwardly inclined so that a horizontal component of an inclined direction of the flank is coincident with a direction perpendicular to a feeding direction of the tray main body fed by the driving roller and the driven rollers is formed on an upper surface of the fitting convex portion in the tray according to the first or the second aspect of the invention.

According to the third aspect of the invention, a flank that is downwardly inclined so that a horizontal component of an inclined direction of the flank is coincident with a direction perpendicular to a feeding direction of the tray main body fed by the driving roller and the driven rollers is formed on an upper surface of the fitting convex portion. Accordingly, interference of the fitting convex portion and an element, for example, the driven rollers, a holding member for pivotally supporting the driven rollers, or the like disposed on a tray transport pathway is prevented and deterioration of tray transport accuracy can be prevented.

According to a fourth aspect of the invention, there is provided a try in which the elastic piece is integrally formed with the tray main body by cutting out the tray main body, and a back side of the elastic piece is evacuated from an back surface of the tray main body in the state where no thin plate shaped body is set in the tray according to any one of the first to third aspects of the invention.

According to the fourth aspect of the invention, a back side of the elastic piece is evacuated from a back surface of the tray main body in the state where no thin plate shaped body is set. Accordingly, the back side of the elastic piece does not project from the back surface of the tray main body with an elastic deformation of the elastic piece. Herewith, deterioration of transport accuracy due to projection of the back side of the elastic piece from the back surface of the tray main body can be prevented.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
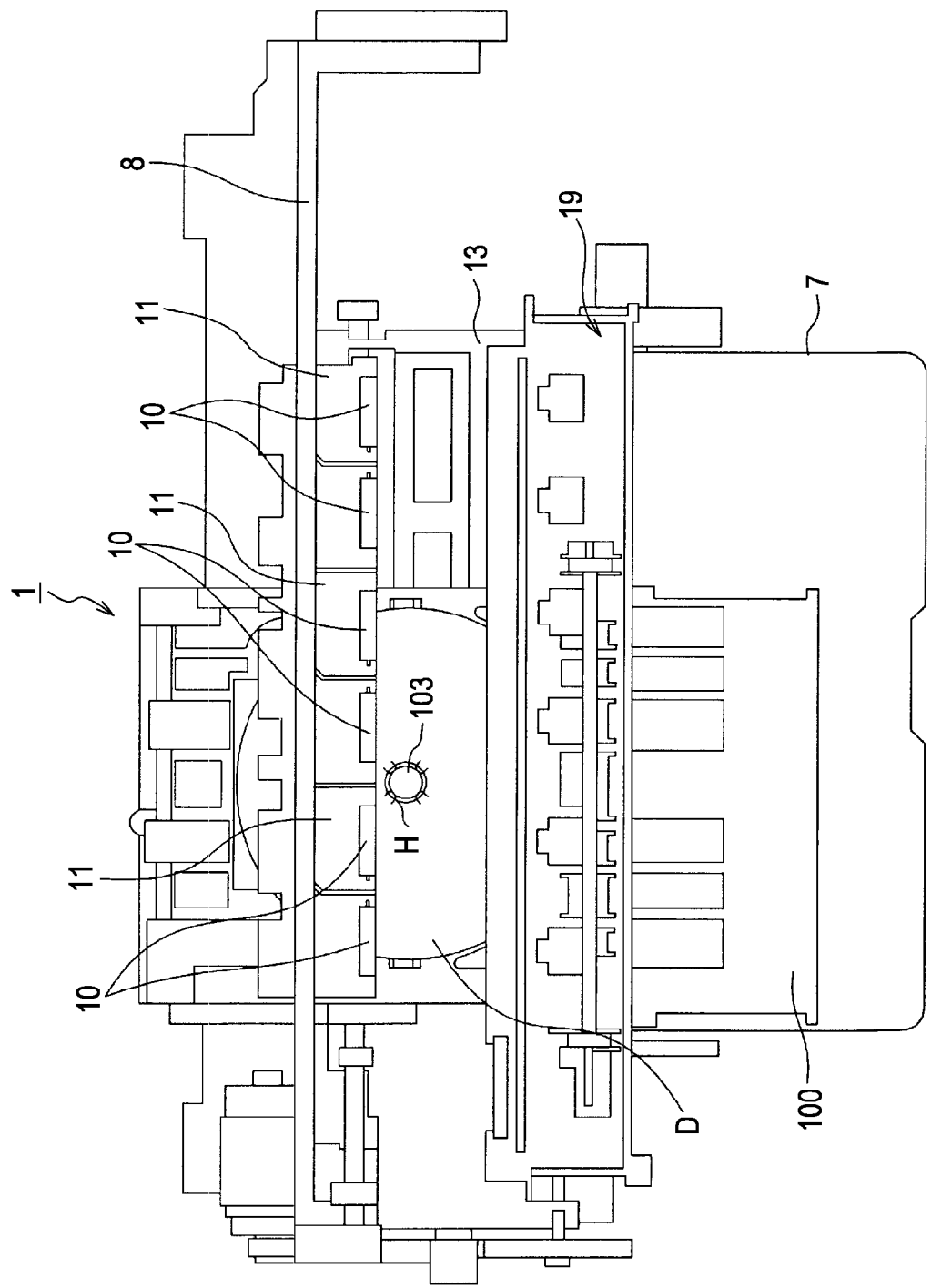
FIG. 1 is a plan view showing a device main body of an ink jet printer.
Figure 2:
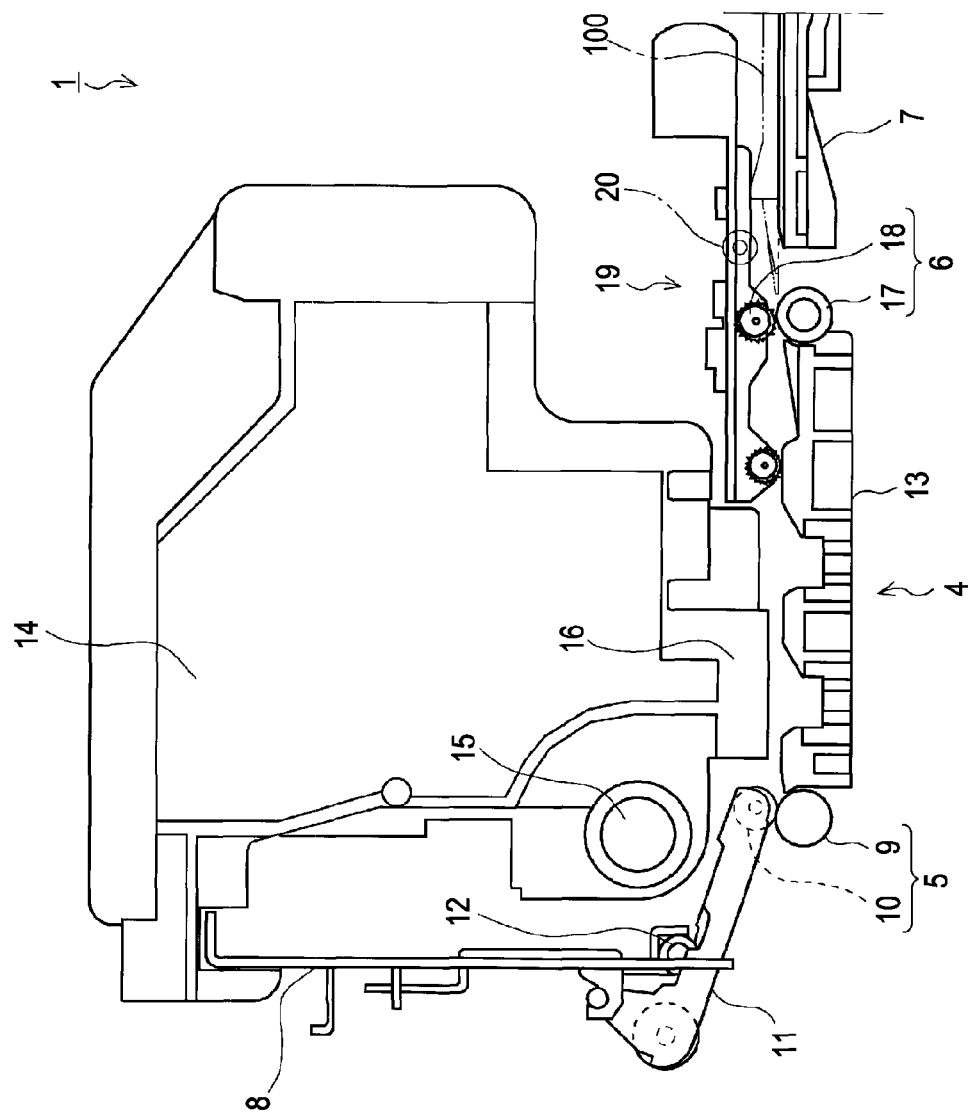
FIG. 2 is a sectional side view showing the device main body of the ink jet printer.
Figure 3:
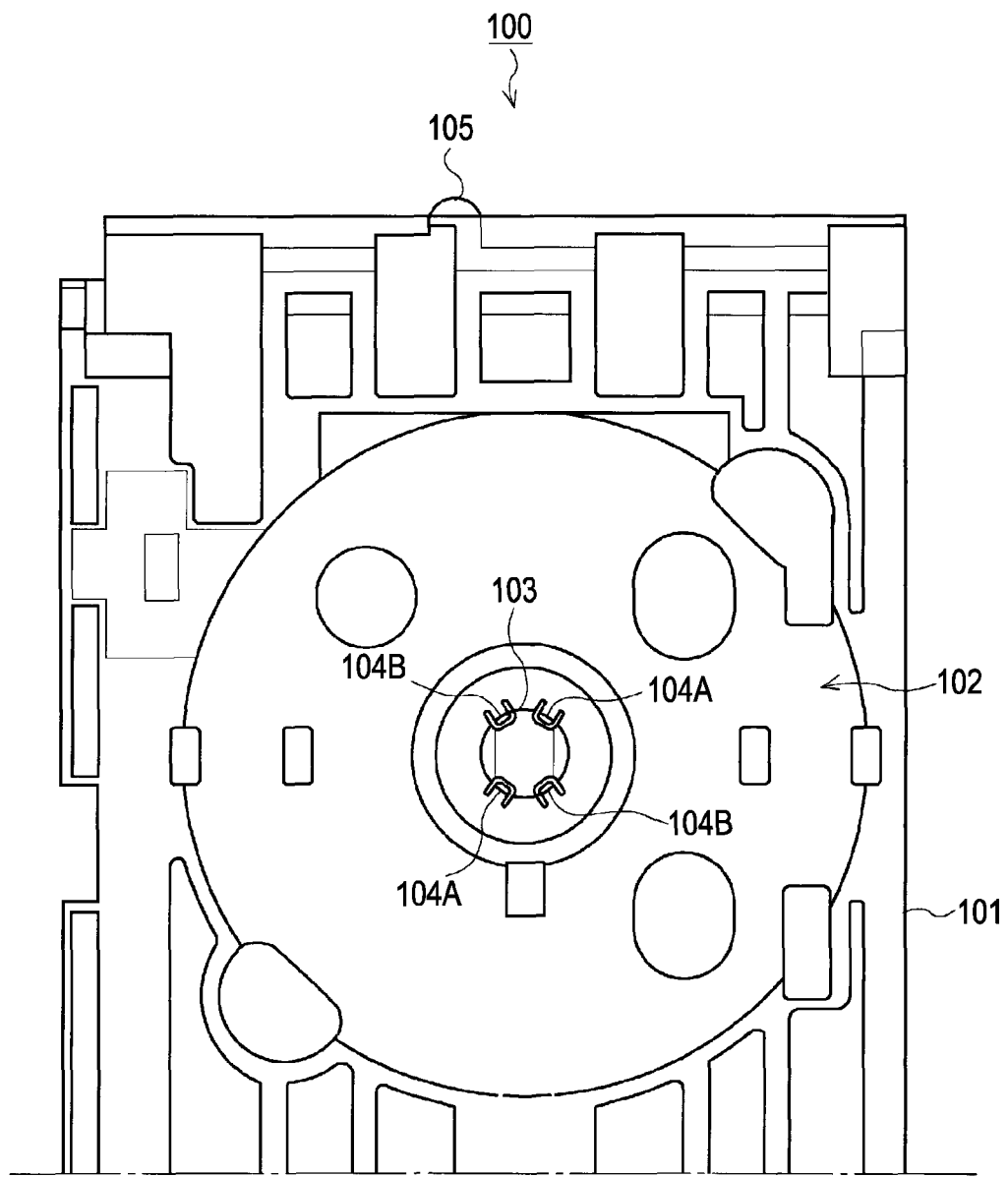
FIG. 3 is a plan view showing a tray according to the invention.

Hereinafter, an embodiment of the invention will be described with reference to the accompanying drawings. FIG. 1 is a plan view showing a device main body of an ink jet printer (hereinafter, referred to as "printer") 1 as an example of a recording device, FIG. 2 is a sectional side view thereof, and FIG. 3 is a plan view showing a tray according to the invention. Note that, a fitting convex portion shown in FIG. 3 is the one according to [embodiment 1] described below.

Figure 4:
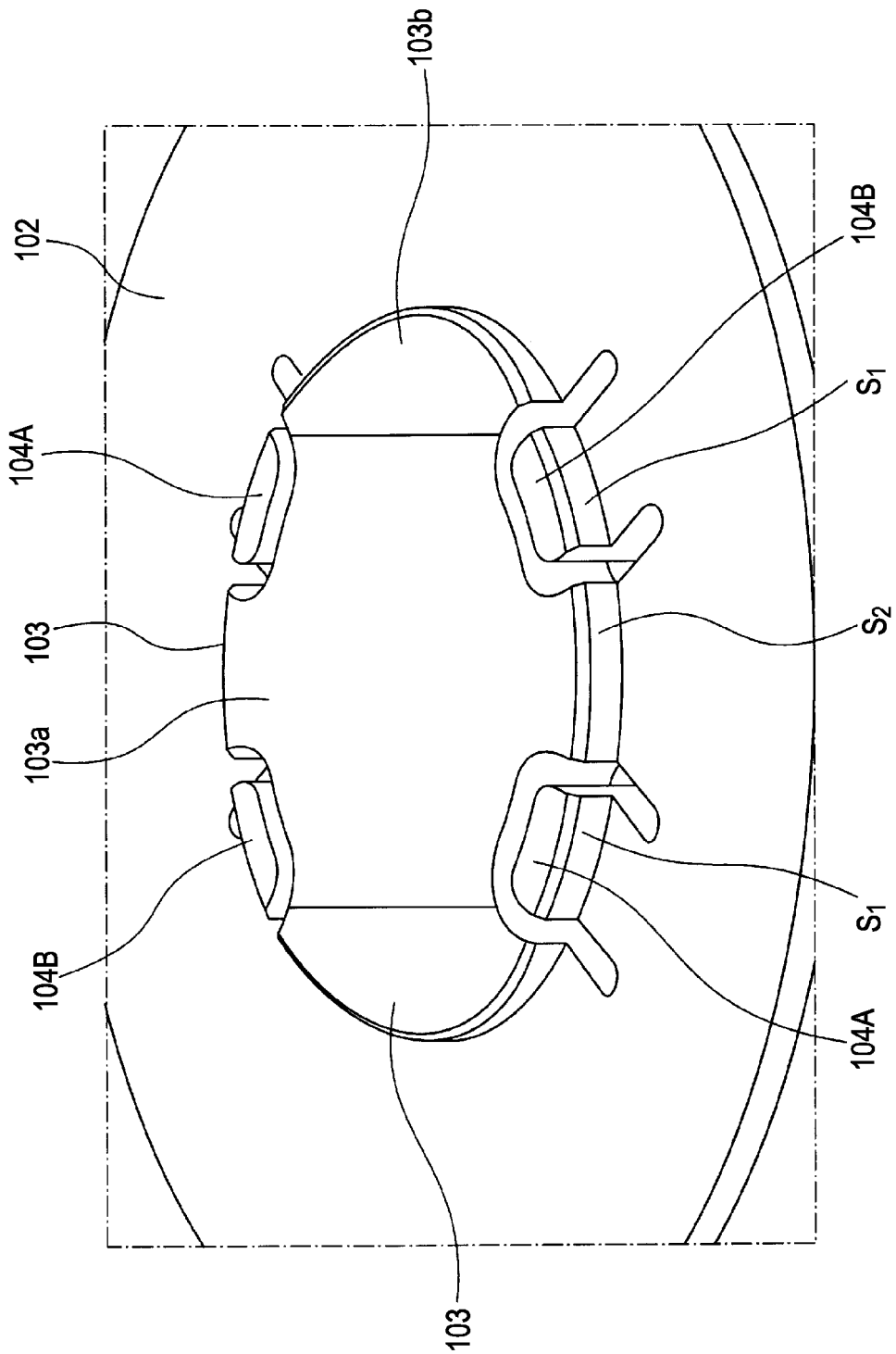
FIG. 4 is a perspective view showing a fitting convex portion according to a first embodiment.
Figure 5:
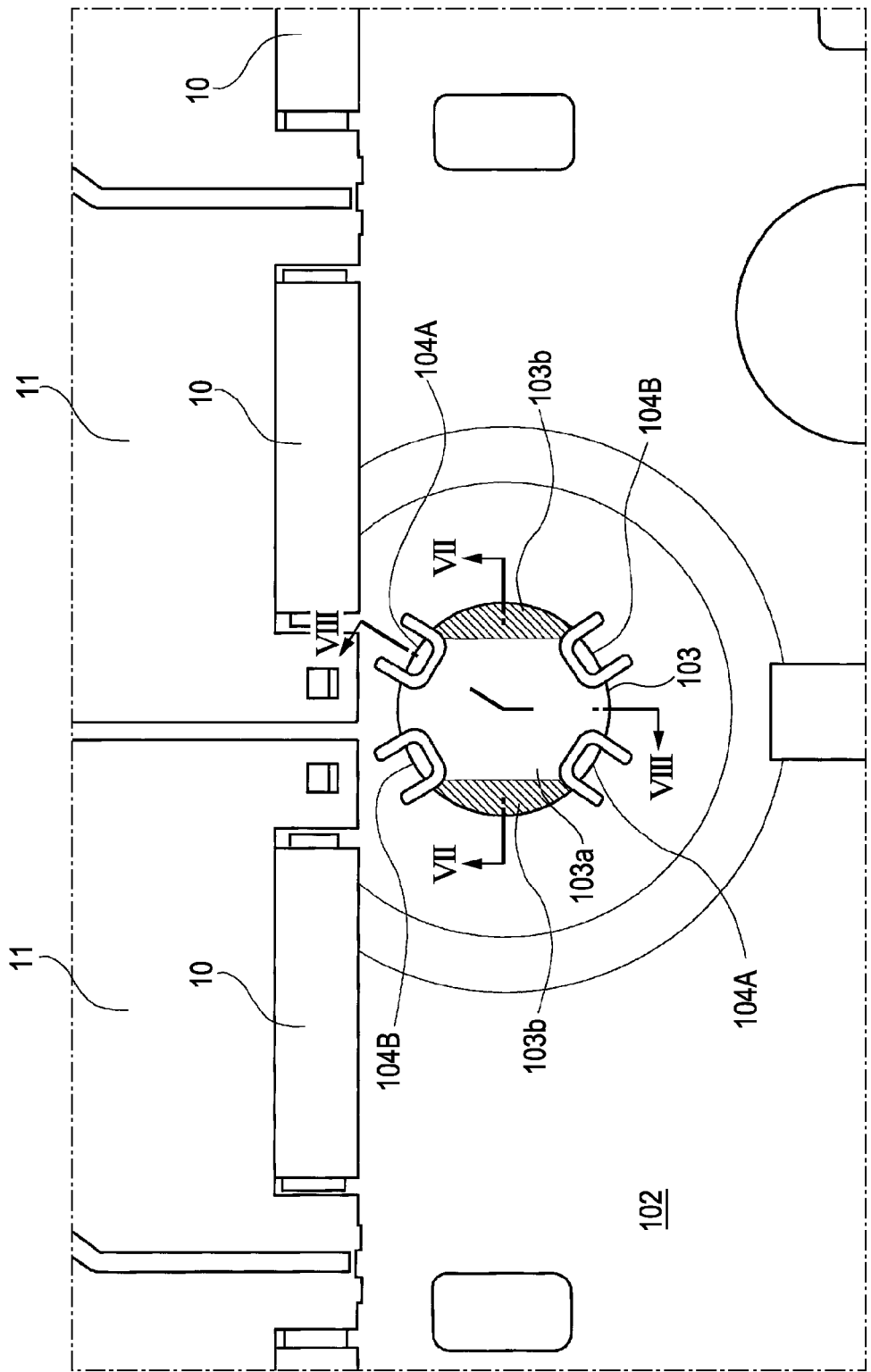
FIG. 5 is a plan view showing the fitting convex portion according to the first embodiment.
Figure 6:
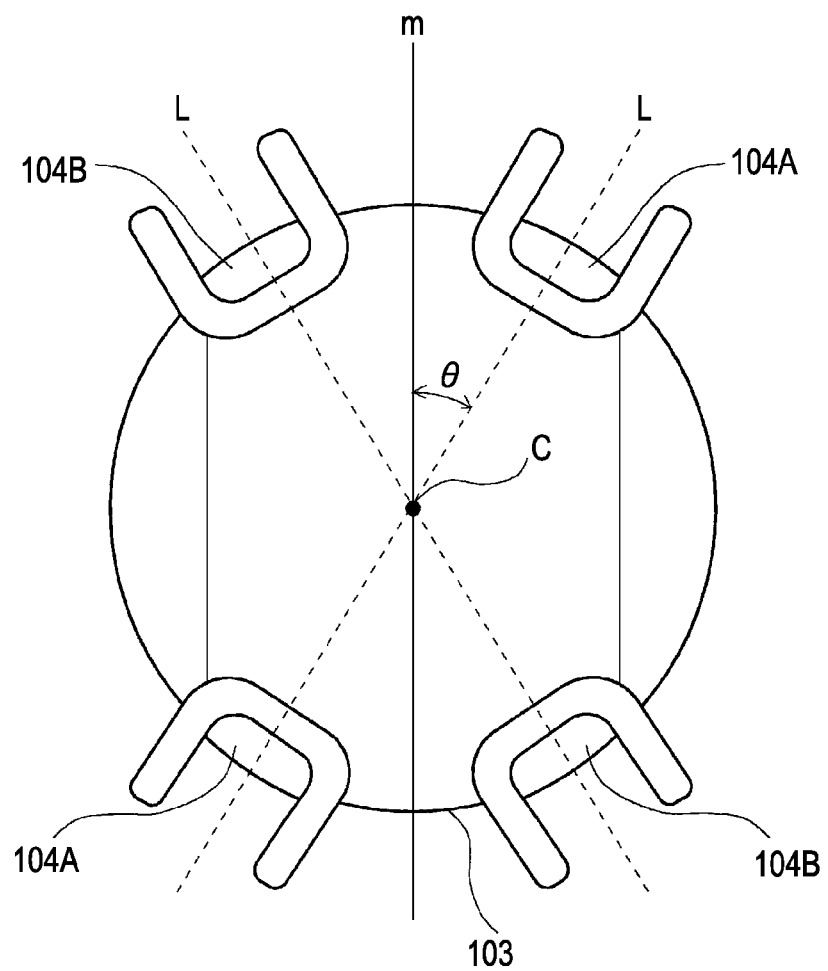
FIG. 6 is an enlarged plan view showing the fitting convex portion according to the first embodiment.
Figure 7:
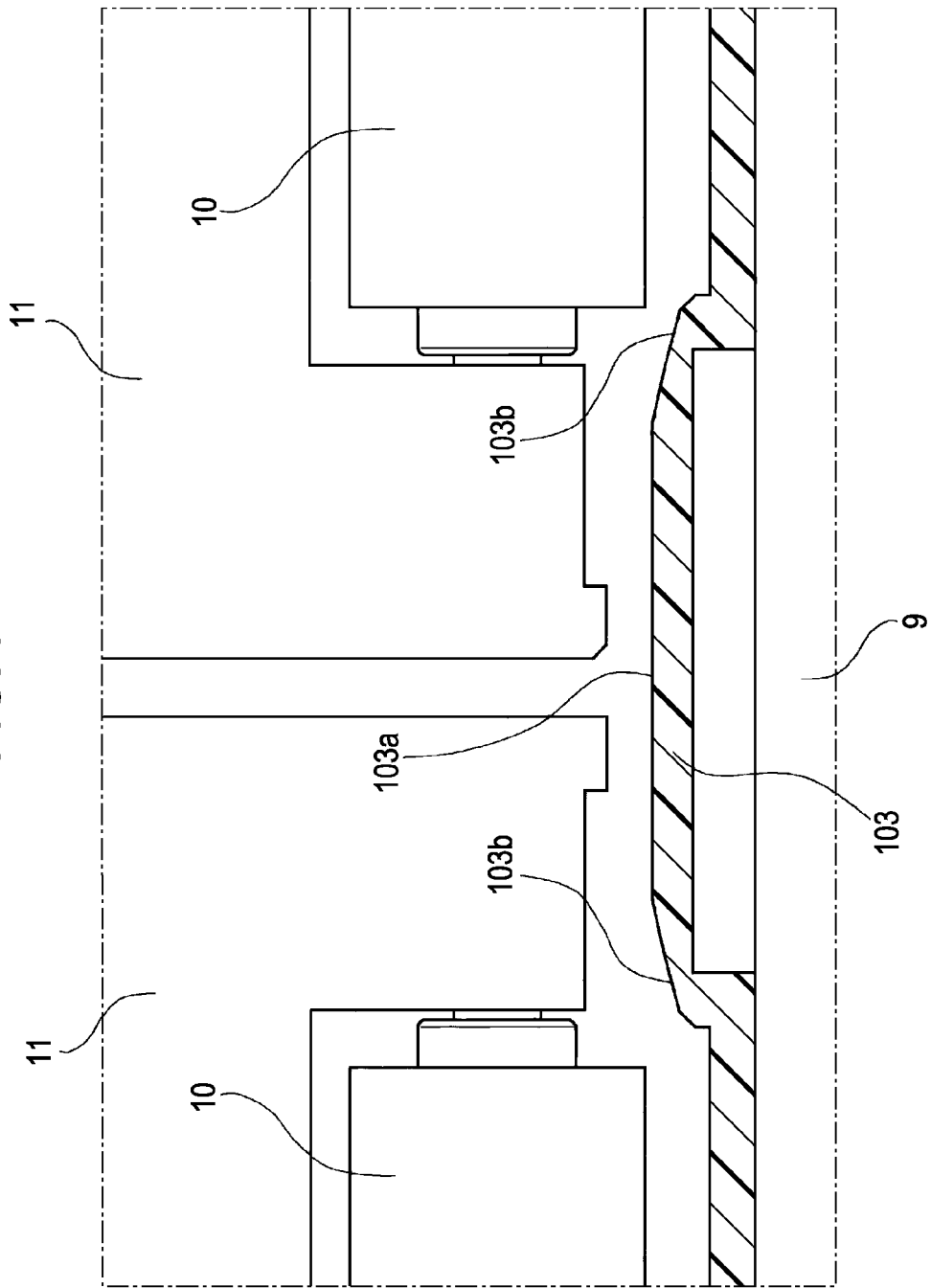
FIG. 7 is a cross sectional view taken along the line VII-VII of FIG. 5.
Figure 8:
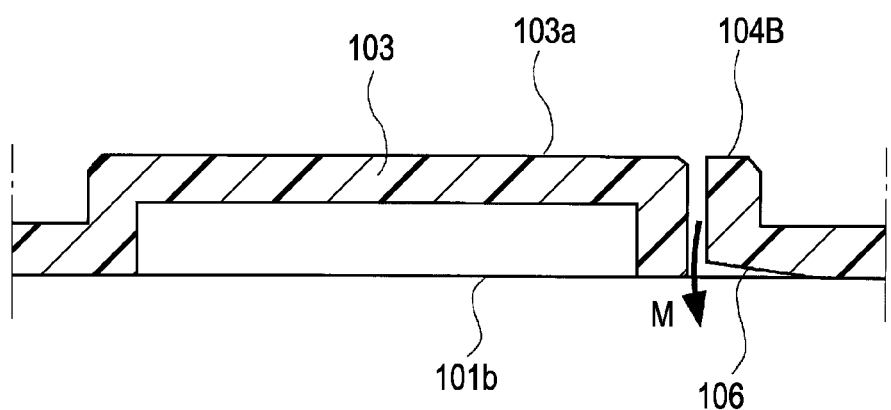
FIG. 8 is a cross sectional view taken along the line VIII-VIII of FIG. 5.

Further, FIG. 4 is a perspective view showing a first embodiment (embodiment 1) of the fitting convex portion of the tray according to the invention, FIG. 5 is a plan view thereof (including a structure of the printer), FIG. 6 is an enlarged plan view showing the fitting convex portion, FIG. 7 is a cross sectional view taken along the line VII-VII of FIG. 5, and FIG. 8 is a cross sectional view taken along the line VIII-VIII of FIG. 5.

Figure 9:
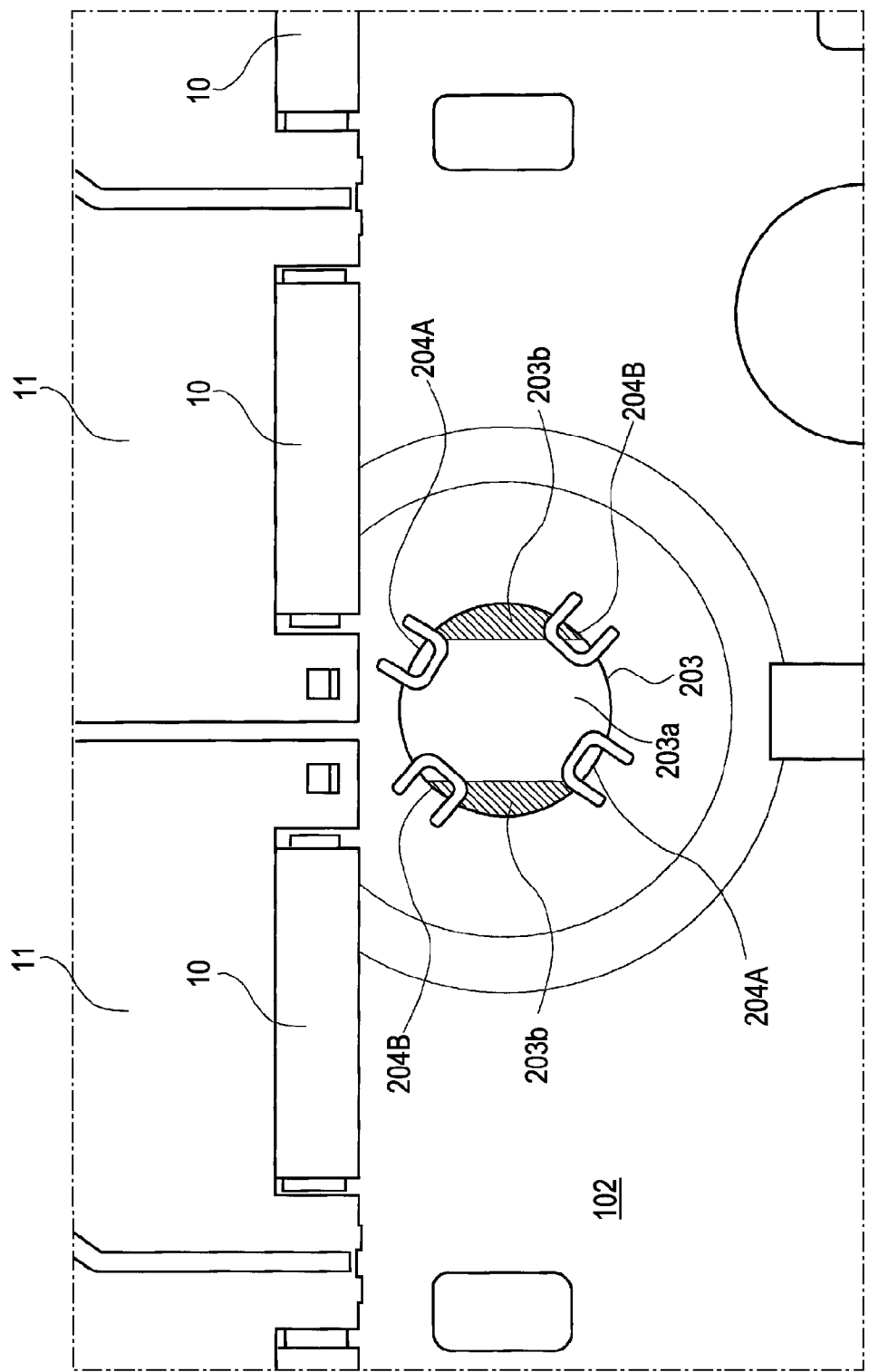
FIG. 9 is a plan view showing a fitting convex portion according to a second embodiment.
Figure 10:
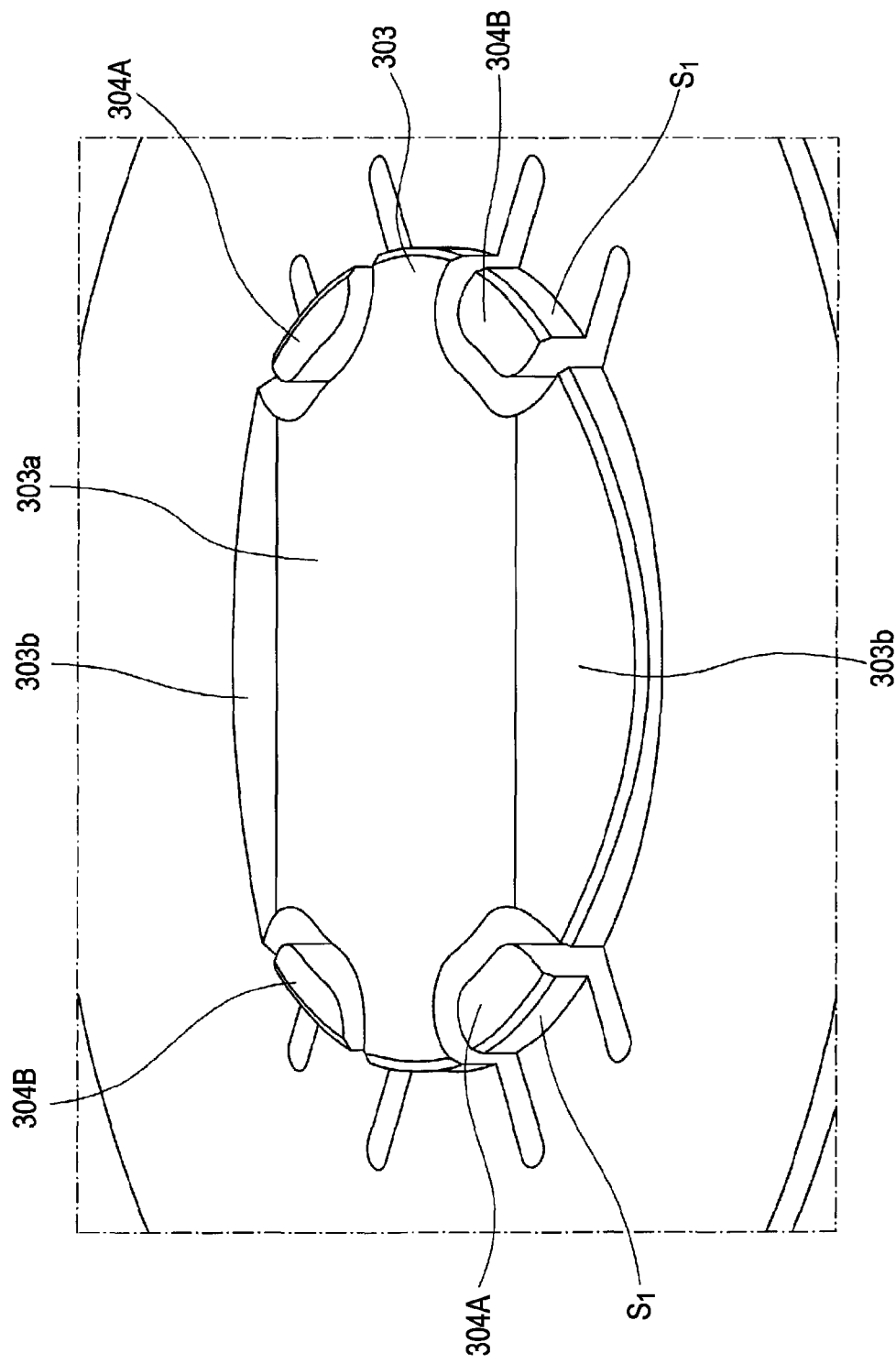
FIG. 10 is a perspective view showing a fitting convex portion according to a third embodiment.
Figure 11:
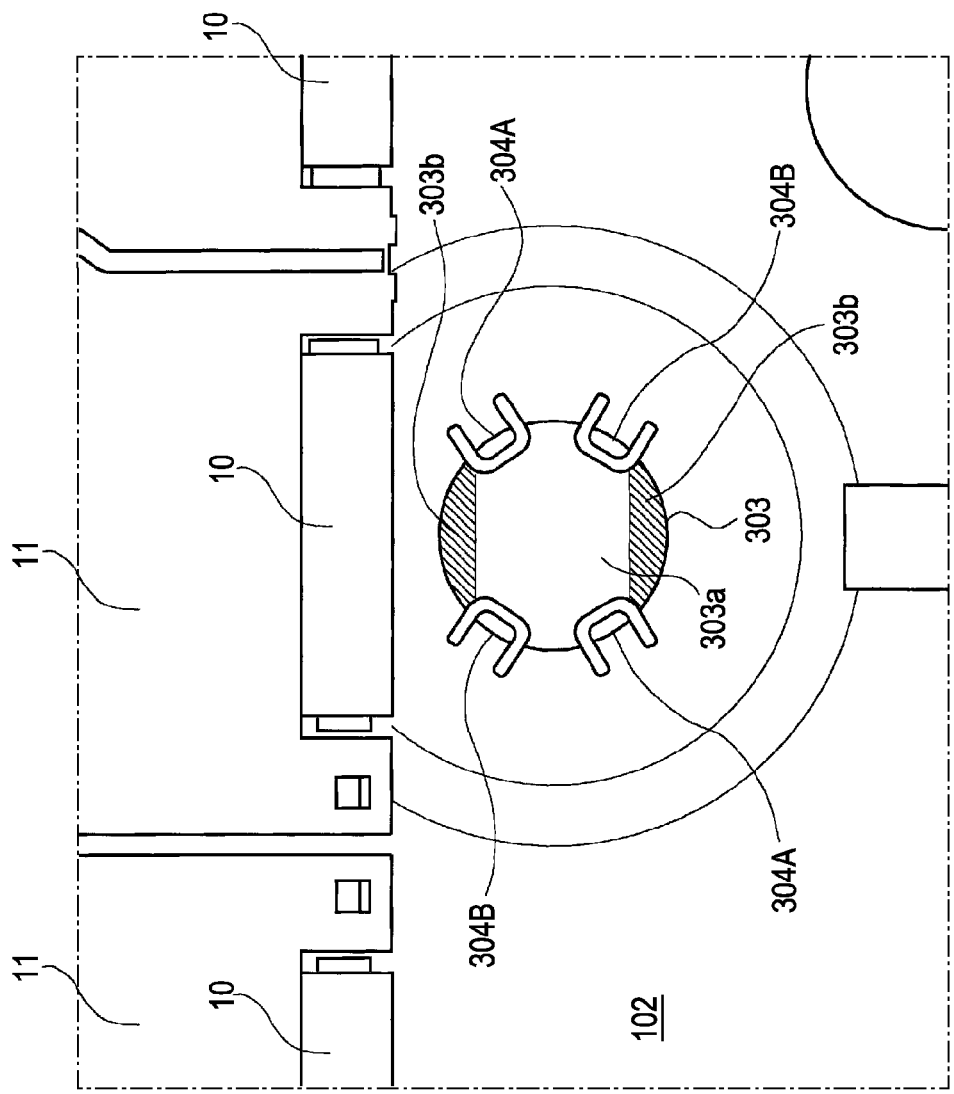
FIG. 11 is a plan view showing the fitting convex portion according to the third embodiment.
Figure 12:
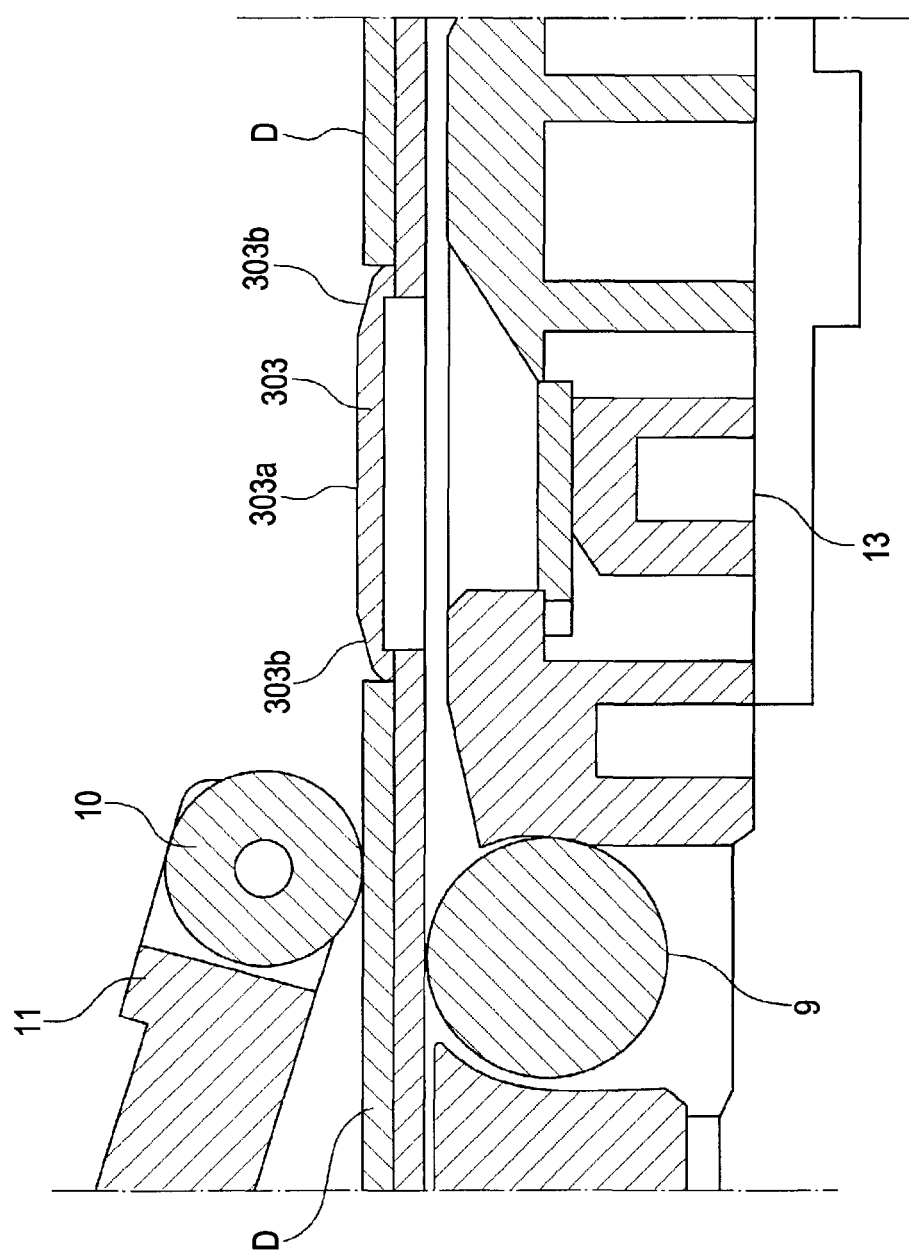
FIG. 12 is a sectional side view showing the fitting convex portion according to the third embodiment.
Figure 13:
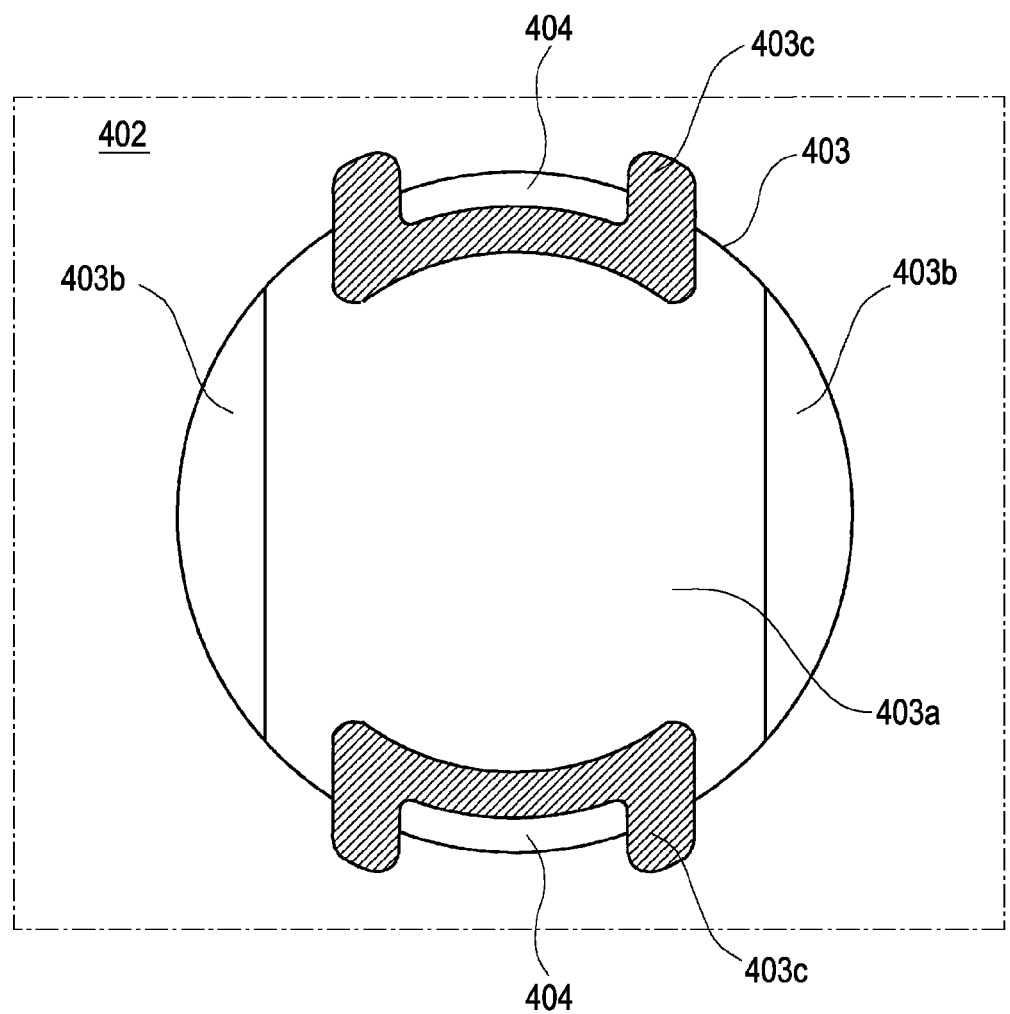
FIG. 13 is a plan view showing a fitting convex portion according to a fourth embodiment.

Further, FIG. 9 is a plan view (including a structure of the printer) showing another embodiment (embodiment 2) of the fitting convex portion, FIG. 10 is a perspective view showing another embodiment (embodiment 3) of the fitting convex portion, FIG. 11 is a plan view thereof (including a structure of the printer), and FIG. 12 is a sectional side view thereof (including a structure of the printer). Further, FIG. 13 is a plan view showing another embodiment (embodiment 4) of the fitting convex portion.

Hereinafter, first, a structure of the printer 1 will be described with reference to FIGS. 1 and 2. The printer 1 is equipped with a feeding device (not shown) on which a recording paper (mainly, single sheet paper: hereinafter referred to as "paper P") as an example of a "medium to be recorded" can be set at a rear end. The papers P are fed towered transport means 5 positioned at a downstream side from the feeding device one by one.

The fed paper P is transported to recording means 4 positioned at the downstream side by the transport means 5, and recording is performed. Note that the transport means 5 also transports a tray 100 that will be described below, and the recording means 4 also performs recording on a label surface of an optical disc D as a thin plate shaped body (medium to be recorded) set in the tray 100. The paper P on which recording is performed by the recording means 5 is discharged in front of the device by discharge means 6 positioned at the downstream side. Further, the tray 100 in which the optical disc D on which recording is performed by the recording means 5 is set is discharged in front of the device by a discharge driving roller 17 and a guide roller 20.

Hereinafter, the detail will be further described. The transport means 5 is equipped with a transport driving roller 9 rotatably driven and transport driven rollers 10 driven to rotate by making contact with the transport driving roller 9. The transport driving roller 9 is constituted by an integral shaft (metal shaft) which is long in an axial direction and a high friction layer formed by adhering particles having abrasion resistance is provided on the surface.

A plurality of the transport driven rollers 10 are disposed with a predetermined distance in the axial direction of the transport driving roller 9. In the embodiment, two transport driven rollers 10 are pivotally supported by one paper guide top 11. The paper guide top 11 is provided in a main frame 8 constituting a basic body of the printer 1 so as to be swung when viewed from a side of a paper transport pathway. In addition, the paper guide top 11 is biased by a coil spring 12 as bias means in the direction in which the transport driven rollers 10 are moved to make contact with the transport driving roller 9.

The recording means 4 is equipped with a recording head 16 for ejecting ink toward the recording paper P or the optical disc D, and a paper guide front 13 for regulating a distance between the paper P and the recording head 16 by supporting the paper P.

The recording head 16 is provided at a bottom of a carriage 14, and the carriage 14 is reciprocally driven in a main scanning direction by a driving motor not shown while being guided by a carriage guide axis 15 extending in the main scanning direction (left and right direction in FIG. 1, front and back direction of the plane of the paper in FIG. 2). Further, the carriage 14 mounts ink cartridges (not shown) that are independent for every plurality of colors, and ink is supplied to the recording head 16 from the cartridges 14. Note that so called an off carriage type in which no ink cartridge is mounted in the carriage 14 may be employed.

The discharge means 6 for discharging the pepper P on which recording is performed is provided at the downstream side of the recording means 4. The discharging means 6 is equipped with a discharge driving roller 17 rotatably driven and a discharging driven roller 18 driven to rotate by making contact with the discharge driving roller 17.

Herein, reference numeral 19 shows a frame assembly. The frame assembly 19 is equipped with the discharge driven roller 18 and a guide roller 20. The frame assembly 19 can take a lower position (position shown in FIG. 2) at which the discharge driven roller 18 is made contact with the discharge driving roller 17 and an upper position (omitted in FIG. 2) at which the discharge driven roller 18 is apart from the discharge driving roller 17 by being displaced in the upper direction from the lower position.

When the frame assembly 19 is in the lower position, the discharge driven roller 18 is made contact with the discharge driving roller 19. Herewith, the paper P on which recording is performed is discharged in front of the device (lower direction in FIG. 1 and right direction in FIG. 2) by being nipped by the both rollers. On the other hand, when the frame assembly 19 is in the upper position, the tray 100 in which the optical disc D as an example of a thin plate shaped body is set can be transported.

Hereinafter, recording on the optical disc D will be further described. The tray 100 having a plate shape in which the optical disc D as a medium to be recorded can be set is transported through a straight tray transport pathway in the printer 1. The tray 100 is inserted toward a back side from a front side of the printer 1 while being supported by a tray guide 7 provided in front of the printer 1. Then, recording is performed on a label surface of the optical disc D while the tray 100 is being transported by the transport means 5 in a sub scanning direction.

The discharge driven roller 18 is a teeth-attached roller equipped with teeth on the outer periphery. Accordingly, there is a fear that a data area is destroyed when made contact with the label surface of the optical disc D. Accordingly, the frame assembly 19 equipped with the discharge driven roller 18 is set at the above described upper position when transporting the tray 100.

Note that the guide roller shown by reference numeral 20 in FIG. 2 is shifted apart from the transport pathway when the frame assembly 19 is set at the lower position. On the other hand, when the frame assembly 19 is set at the upper position (when the tray 100 is supplied in the transport pathway), the guide roller can be proceeded to the transport pathway to be made contact with both side ends of the upper surface of the tray 100. The tray 100 is fed toward the transport means 5 positioned at an upstream side or discharged to the downstream side by rotating the discharge driving roller 17 in the sate where nipped by the guide roller 20 and the discharge driving roller 17.

The structure of the printer 1 is as described above. Hereinafter, a structure of the tray 100 will be described in detail with reference to FIG. 3, FIG. 1, and the like. The tray 100 has a rectangular shape in plan view and has a plate shape which can be nipped by the transport driving roller 9 and the transport driven rollers 10. The tray 100 can be transmitted in the sub scanning direction with the rotation of the transport driving roller 9.

The tray 100 is equipped with a tray main body 101 and a concave portion 102 in which the optical disc D can be set. The concave portion 102 has a circular shape in plan view and a fitting convex portion shown by reference numeral 103 in FIGS. 1 and 3 is formed at the center.

When the optical disc D is set in the concave portion 102, a fitting hole of the optical disc D (center hole: shown by reference numeral H in FIG. 1) is fitted in the fitting convex portion 103. Herewith, the position of the optical disc D in the concave portion 102 (tray 100) is to be settled.

Further, a plurality of elastic pieces are formed in the fitting convex portion 103 as shown by reference numerals 104A, 104B in FIG. 3. The elastic pieces are elastically made contact with an inner edge of the fitting hole of the optical disc D. Herewith, the optical disc D is held so as not to be easily disengaged from the fitting convex portion 103. Note that the fitting convex portion 103 and the elastic pieces 104A, 104B are integrally formed with the tray main body 101 (concave portion 102) by a resin material.

The transporting direction of the tray 100 (sub scanning transport direction) is set in the up and down direction in FIG. 3. When the tray 100 is inserted to the transport pathway of the printer 1 via the tray guide 7 as described above, the tray 100 is to be inserted so that the upper direction thereof in FIG. 3 is to be inserted as a distal end. A tongue portion 105 is integrally formed with the tray 100 at the distal end of the tray 100 so as to project in an inserting direction of the tray 100.

Herewith, when the tray 100 is fed toward the transport means 5 by the discharge driving roller 17 and the guide roller 20, the tongue portion 105 is easily intruded between the transport driving roller 9 and the transport driven rollers 10 to be nipped by the both rollers.

Embodiment 1 of Fitting Convex Portion

Hereinafter a first embodiment (embodiment 1 of the fitting convex portion) of the invention will be descried with reference to FIGS. 4 to 8.

A fitting hole (center hole) of the optical disc D to be set in the tray 100 has a circular shape. Accordingly, the fitting convex portion 103 that fits in the fitting hole also has a circular shape in plan view.

Reference numerals 104A, 104A are a pair of elastic pieces that hold the optical disk D by acting elastic forces in directions to expand the fitting hole of the optical disc D, and the elastic pieces 104A, 104A are disposed to sandwich the center C of the fitting convex portion 103 on a straight line (straight line L of FIG. 6) passing through the center (center C of FIG. 6) of the fitting convex portion 103. The elastic pieces shown by reference numeral 104B, 104B are also a pair of elastic pieces that hold the optical disc D by acting elastic forces in directions to expand the fitting hole of the optical disc D. In this manner, two pairs of elastic pieces that hold the optical disc D are provided in the fitting convex portion 103.

The elastic pieces are formed by cutting out the concave portion 102 and the fitting convex portion 103 at a plurality of portions along the outer edge of the fitting convex portion 103 as shown in the drawings. That is the elastic pieces are integrally formed with the tray main body 101. Note that the elastic pieces are formed so that a surface S1 that makes contact with the inner edge of the optical disc D slightly projects in the diameter direction than the outer edge S2 of the fitting convex portion 103. Herewith, the surface S1 is to be elastically made contact with the inner edge of the fitting hole of the optical disc D.

The fitting convex portion 103 is disposed at a place to pass through a position between the two paper guide tops 11, 11 among the plurality of paper guide tops 11 disposed with an appropriate distance in the axis line direction of the transport driving roller 9, and is disposed at a place to pass through approximately the middle of the two transport driven rollers 10. Further, the tray guide 7 (FIG. 1) for guiding the tray 100 regulates the position of the tray 100 in digit direction so that the fitting convex portion 103 passes through the place as described above.

A flat surface 103a is formed at an center area of the upper surface of the fitting convex portion 103, and sloping surfaces (flanks) 103b, 103b are formed at both sides (both sides of digit direction) of the flat surface 103a. The sloping surfaces 103b, 103b are downwardly inclined from the flat surface 103a so that horizontal components of inclined directions of the sloping surfaces 103b, 103b are coincident with directions (left and right directions in FIG. 5) perpendicular to a feeding direction of the tray (up and down direction in FIG. 5). Note that the areas of the sloping surfaces 103b, 103b are shown with hatchings in order to clear the areas of the sloping surfaces 103b, 103b in FIG. 5.

By the sloping surfaces 103b, interference of the fitting convex portions 103 and the transport driven rollers 10 is prevented as shown in FIG. 7, and the deterioration of transport accuracy of the tray 100 can be prevented when the fitting convex portions 103 pass through the transport driven rollers 10. Note that the boundary lines between the sloping surfaces 103b and the flat surface 103 are parallel to the feeding direction of the tray 100 in the embodiment.

In the embodiment, the elastic pieces 104A, 104B are disposed at positions to avoid areas through which the transport driven rollers 10 pass. That is, if the elastic pieces 104A, 104B are disposed at areas through which the transport driven rollers 10 pass, there is a fear that the elastic pieces 104A, 104B are pressed by the transport driven rollers 10 to unlock the state of the optical disc D held by the elastic pieces 104A, 104B. However, since the elastic pieces 104A, 104B are disposed at positions to avoid the areas through which the transport driven rollers 10 pass as described above, the occurrence of such a trouble is surely prevented.

Note that it is not necessary to form the sloping surfaces 103b on the upper surface of the fitting convex portion 103 in the case where obtaining only the aforementioned effect by disposing the elastic pieces 104A, 104B at positions to avoid the areas through which the transport driven rollers 10 pass. That is, regardless of the shape of the upper surface of the fitting convex portion 103, the effect can be obtained if the elastic pieces 104A, 104B are disposed at the positions to avoid the areas through which the transport driven rollers 10 pass.

The elastic pieces 104A, 104B are disposed at positions to avoid the sloping surfaces 103b in the embodiment. Accordingly, decrease of the area of the surface S1 of each of the elastic pieces 104A, 104B is prevented and the optical disc D is to be surly held so as not to be easily disengaged from the tray 100. Further, since the elastic pieces 104A, 104B are symmetrically disposed with respect to the transport direction of the tray 100, the optical disc D can be further stably held when transporting the tray 100.

Specifically, the angle θ (θ in FIG. 6) made by the straight line connecting the two elastic pieces (straight line L of FIG. 6) and the straight line parallel to the tray transporting direction (straight line m of FIG. 6) satisfies 0 deg<θ<45 deg in each of the pair of the elastic pieces 104A, 104A and the pair of the elastic pieces 104B, 104B.

That is, since the plurality of elastic pieces are disposed (concentrated) at positions closer to the straight line parallel to the tray transporting direction on the upper surface of the fitting convex portion 103, the optical disc D can be surly held even when the tray in which the optical disc D is set is transported.

A flank 106 is formed to evacuate from a back surface 101b of the tray main body 101 at a back side of each of the elastic pieces 104A, 104B as shown in FIG. 8. Since the back side of each of the elastic pieces 104A, 104B is evacuated from the back surface 101b of the tray main body 101, the back side does not project from the back surface 101b of the tray main body 101 with an elastic deformation of each of the elastic pieces 104A, 104B (elastic deformation shown by the arrow M in FIG. 8), that is, each of the elastic pieces 104A, 104B does not project to the side of the transport driving roller 9. Accordingly, deterioration of transport accuracy due to the projection of the back surfaces the elastic pieces 104A, 104B from the back surface 101b of the tray main body 101 is prevented.

Embodiment 2 of Fitting Convex Portion

Hereinafter, a second embodiment (embodiment 2 of the fitting convex portion) of the invention will be described with reference to FIG. 9. A flat surface 203a and sloping surfaces 203b similar to the flat surface 103a and the sloping surfaces 103b in the [embodiment 1] are formed in a fitting convex portion 203 of FIG. 9.

A point of the fitting convex portion 203 in the embodiment that is different from the fitting convex portion 103 in the embodiment 1 is that a pair of elastic pieces (204B, 204B) are disposed at positions overlapping with the sloping surfaces 203b, 203b. Herewith, the elastic pieces 204A, 204B can be evenly disposed in the circumferential direction of the fitting convex portion 203. Accordingly, the elastic pieces 204A, 204B can be disposed with a good valance without slanting in the circumferential direction.

Note that the sloping surface 203b is formed at a part of the upper surface of each of the elastic pieces 204B, 204B in the embodiment. Accordingly, even when there occurs variation of the position of the tray 100 in digit direction and the transport driven rollers 10 pass through the positions of the elastic pieces 204B, 204B, it is prevented that the transport driven rollers 10 press the elastic pieces 204B, 204B from the upper direction. Accordingly, it is prevented that the elastic pieces 204B, 204B are pressed from the upper direction to unlock the held state of the optical disc D.

Note that, in the case where there is almost no fear that the one pair of elastic pieces 204B, 204B are not positioned at areas through which the transport driven rollers 10 are pass even when there occurs a variation of the position of the tray 100 in digit direction, all of the upper surfaces of the one pair of the elastic pieces 204B, 204B may be flat surfaces.

Note that the flank 106 as described with reference to FIG. 8 may be formed at a back side of each of the elastic pieces 204A, 204B.

Embodiment 3 of Fitting Convex Portion

Hereinafter, another embodiment (embodiment 3) of the fitting convex portion will be described with reference to FIGS. 10 to 12. A fitting convex portion 303 shown in FIGS. 10 to 12 is disposed at a place through which the transport driven roller 10 passes different from the [embodiment 1] and the [embodiment 2].

A flat surface 303a is formed at a center area of the upper surface of the fitting convex portion 303 similarly to the [embodiment 1] and the [embodiment 2]. Further, sloping surfaces (guide surfaces) 303b, 303b are formed at the front and back directions of the flat surface 303a. The sloping surfaces 303b, 303b are downwardly inclined so that horizontal components of inclined directions of the sloping surfaces 303b, 303b are coincident with the feeding directions of the tray (up and down direction in FIG. 11: left and right direction in FIG. 12). Note that the areas of the sloping surfaces 303b, 303b are shown with hatchings in order to clear the areas of the sloping surfaces 303b, 303b in FIG. 11.

With the sloping surfaces 303b, even when the fitting convex portion 303 has to be disposed at a position passed through by the transport driven roller 10 for reasons of layout, the sloping surfaces 303b become guide surfaces. Accordingly, it becomes possible that the transport driven roller 10 smoothly passes through the fitting convex portion 303 (FIG. 12).

Then, the elastic pieces 304A, 304B are disposed at positions to avoid the sloping surfaces 303b. Herewith, decrease of the area of the surfaces (surfaces S1) made contact with the inner edge of the fitting hole of the optical disc D can be prevented and the optical disc D is surely held so as not to be easily disengaged from the tray.

Further, the angle θ (θ in FIG. 6) made by the straight line connecting the two elastic pieces (straight line L of FIG. 6) and the straight line parallel to the tray transporting direction (straight line m of FIG. 6) satisfies 0 deg<θ<45 deg in each of the pair of the elastic pieces 304A, 304A and the pair of the elastic pieces 304B, 304B.

That is, since the plurality of elastic pieces are disposed (concentrated) at positions closer to the straight line passing through the center C of the fitting convex portion 303 and perpendicular to the tray transporting direction (straight line perpendicular to straight line m) on the upper surface of the fitting convex portion 303, the inclination of the sloping surface 303b can be further moderated, and the transport driven roller 10 can more smoothly pass through the fitting convex portion 303.

Note that the flank 106 as described with reference to FIG. 8 may be formed at a back side of each of the elastic pieces 304A, 304B.

Embodiment 4 of Fitting Convex Portion

Hereinafter, another embodiment (embodiment 4) of the fitting convex portion will be described with reference to FIG. 13. The four elastic pieces are provided for one fitting convex portion in the embodiments 1 to 3. However, two elastic pieces shown by reference numeral 404 are provided for a fitting convex portion 403 as shown in FIG. 13.

The elastic pieces 404, 404 are disposed to sandwich the center on a straight line passing the center of a fitting convex portion 403 to hold the optical disc D by acting elastic forces in directions to expand the fitting hole of the optical disc D. Areas shown by reference numeral 403c (areas shown by oblique lines) are cutouts formed on a concave portion 402 and the fitting convex portion 403. Herewith, the elastic pieces 404 are integrally formed with the tray main body.

Each of the elastic pieces 404 has a larger dominating ratio in the circumferential direction of the fitting convex portion 403 as shown in FIG. 13. Herewith, an elastic force when elastically making contact with the inner edge of the fitting hole of the optical disc D is increased. Accordingly, the optical disc D can be held by a larger force.

Note that the elastic piece 404 having the shape as shown in FIG. 13 can be applied to the embodiments 1 to 3. Further, the shape and the number of the elastic piece are not limited to the shapes and the numbers as shown in the embodiments 1 to 4, and it goes without saying that the shape and the number of the elastic piece can be appropriately changed.

What is claimed is:

1. A tray comprising:
   a tray main body having a plate shape, the tray main body having an end configured to be nipped;
   a concave portion in which a thin plate shaped body can be set, the concave portion being formed in the tray main body; and
   a fitting convex portion that is fitted in a fitting hole formed in the thin plate shaped body, the fitting convex portion being provided in the concave portion, the fitting convex portion having an upper surface,
   wherein a sloping surface is formed on the upper surface such that a highest point of the upper surface is higher than the sloping surface.

2. The tray according to claim 1, wherein
   the sloping surface is downwardly inclined so that a horizontal component of an inclined direction of the sloping surface is coincident with a direction perpendicular to a feeding direction of the tray main body.

3. A recording apparatus comprising:
   a driving roller; and
   a first driven roller driven to rotate by making contact with the driving roller,
   wherein the driving roller and the first driven roller contact each other in a first state,
   wherein the driving roller and the first driven roller are separated from each other in a second state,
   wherein the driving roller and the first driven roller are configured to nip a tray when in the second state, the tray including a fitting convex portion having an upper surface,
   wherein the upper surface includes a sloping surface,
   wherein a highest point of a fitting convex portion higher than the sloping surface is disposed at a position that avoids areas through which the first driven roller disposed at an appropriate distance in an axis line direction from the driving roller passes and avoids being pressed by the first driven roller.

4. The recording apparatus according to claim 3, further comprising:
   a second driven roller axially in line with the first driven roller and driven to rotate by making contact with the driving roller.

5. A recording apparatus comprising:
   a tray including:
   a tray main body having a plate shape;
   a concave portion in which a thin plate shaped body can be set, the concave portion being formed in the tray main body; and
   a fitting convex portion that is fitted in a fitting hole formed in the thin plate shaped body, the fitting convex portion being provided in the concave portion, wherein the fitting convex portion has an upper surface with a sloping surface;
   a driving roller; and
   a driven roller driven to rotate by making contact with the driving roller,
   wherein the driving roller and the driven roller contact each other in a first state,
   wherein the driving roller and the first driven roller are separated from each other in a second state,
   wherein, the driving roller and the driven roller are configured to nip the tray main body of the tray when in the second state,
   wherein a highest point of the fitting convex portion that is higher than the sloping surface is disposed at a position that avoids areas through which the driven roller disposed at an appropriate distance in an axis line direction from the driving roller passes and avoids being pressed by the driven roller.

6. The recording apparatus according to claim 5, wherein
   the sloping surface is downwardly inclined so that a horizontal component of an inclined direction of the sloping surface is coincident with a direction perpendicular to a feeding direction of the tray main body fed by the driving roller and the driven roller, wherein the sloping surface is formed in the upper surface of the fitting convex portion.

* * * * *